(12) United States Patent
Jalali et al.

(10) Patent No.: US 12,267,113 B1
(45) Date of Patent: Apr. 1, 2025

(54) AUTONOMOUS WIRELESS HOTSPOT DEVICE

(71) Applicant: WIRELESS PHOTONICS, LLC, El Segundo, CA (US)

(72) Inventors: Bahram Jalali, Los Angeles, CA (US); Nicholas Jalali, Los Angeles, CA (US); William R Ryan, Los Angeles, CA (US); Ahmadreza Rofougaran, Newport Coast, CA (US)

(73) Assignee: Wireless Photonics, LLC, El Segundo, CA (US)

( * ) Notice: Subject to any disclaimer, the term of this patent is extended or adjusted under 35 U.S.C. 154(b) by 0 days.

(21) Appl. No.: 18/882,739

(22) Filed: Sep. 11, 2024

(51) Int. Cl.
  *H04B 10/80* (2013.01)
  *H02J 50/30* (2016.01)
  *H02J 50/80* (2016.01)

(52) U.S. Cl.
  CPC ............ *H04B 10/807* (2013.01); *H02J 50/30* (2016.02); *H02J 50/80* (2016.02); *H04B 10/803* (2013.01)

(58) Field of Classification Search
  None
  See application file for complete search history.

(56) References Cited

U.S. PATENT DOCUMENTS

| | | | |
|---|---|---|---|
| 2004/0266367 A1* | 12/2004 | Tuominen | H04B 10/807 455/91 |
| 2019/0229558 A1* | 7/2019 | Pigeon | A61N 1/3787 |
| 2020/0382198 A1* | 12/2020 | Ashrafi | H04B 7/155 |
| 2020/0403457 A1* | 12/2020 | Nydell | G02B 19/009 |
| 2023/0016800 A1* | 1/2023 | Nugent, Jr. | H02J 50/005 |

* cited by examiner

*Primary Examiner* — David W Lambert

(57) ABSTRACT

An optical power and data delivery system includes an optical base station and an autonomous wireless hotspot device. The optical base station includes routers, a media converter device, a optical data transceiver configured to transmit the received data laser light beams; one or more power laser devices configured to transmit a plurality of power laser light beams, a beam combining device to generate and transmit combined power and data laser light beams through a first optical antenna. The autonomous wireless hotspot device includes a second optical antenna configured to receive the combined data and power laser light beams, an optical dividing device, a optical data transceiver, a media converter device and wireless communication transceivers to transmit wireless data signals and one or more laser power converters to receive the power laser light beams and to convert the power laser light beams into electrical energy.

19 Claims, 10 Drawing Sheets

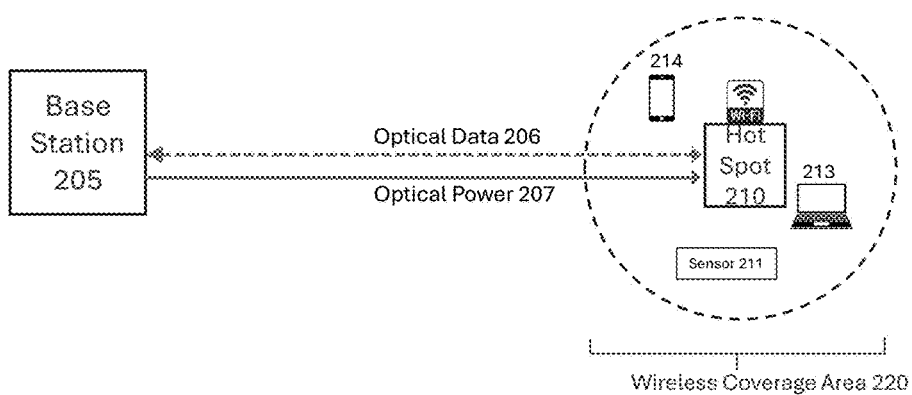

FIG. 2A

Benefits:
- Hotspot can be setup quickly and cheaply without needing to run cables, or without consuming valuable RF bandwidth.
- Hotspots can be replicated covering a large area but with low RF power in each hotspot.
  Reduced transmit RF power and coverage area improves privacy (makes is harder for hackers to eavesdrop).
  Improves network security. Also, reduced exposure to RF radiation.
- Free space optical data delivery to the hotspot is more energy efficient than RF delivery due to a much lower beam divergence at optical wavelengths.

Composite Optical Power, Optical Data, and millimeter beam

Single hybrid beam having 3 constituents
Relative position of mm-wave and optical beams may vary but are fixed w/respect to each other
Cross section of the composite optical power + optical data + mm-wave hybrid beam

AUTONOMOUS WIRELESS HOTSPOT DEVICE

CROSS-REFERENCE TO RELATED APPLICATIONS/INCORPORATION BY REFERENCE

None.

FIELD OF TECHNOLOGY

The claimed subject matter and technology is related to optical wireless power grid system or network and method for communication, sensor and Internet of Things devices.

BACKGROUND

In many cases, wireless communication is desired in spaces or environments where there is no electrical power available. Further, in many cases, radiofrequency bandwidth is limited so other forms of wireless communications may need to be utilized. Also, as discussed in co-pending patent application Ser. No. 18/626,696, "Optical Wireless Power Grid System and Method for Communication, Sensor, and IOT Devices," obtaining additional power for specific indoor areas has always been difficult due to a due to a requirement of laying cables either within walls or structures (and thus requiring construction) or outside of walls (which creates an unpleasing design aesthetic). In addition, it is always difficult to get work done in existing indoor buildings and thus there may be long lead times required to have any new networking components installed.

There is a need for wireless communication devices that do not require power and are also able to receive data so that they can provide a gateway or connection to communication networks such as intranets and/or the internet. In other words, there is a need for wireless routers or hotspot device that are autonomous and do not need wall electrical power (or power provided by a cable) and that also can transmit and receive data.

BRIEF DESCRIPTION OF DRAWINGS

FIG. 2A illustrates a high level data flow diagram of a wireless optical power and data system according to exemplary embodiments;

DETAILED DESCRIPTION OF THE DISCLOSURE

The following detailed description provides a better understanding of the features and advantages of the subject matter described in the present disclosure in accordance with the embodiments disclosed herein. The following detailed description describes a method and system that utilizes an optical transceiver and an autonomous optical wireless hotspot device to establish optical wireless communication in indoor and/or large controlled environments. In some embodiments, these large controlled environments may be outdoor environments where line of sight is available between the optical transceiver and the autonomous optical wireless hotspot device.

In the following description, reference is made to the accompanying drawings, which form a part hereof, and in which is shown, by way of illustration, various embodiments of the present disclosure.

Figure 1:
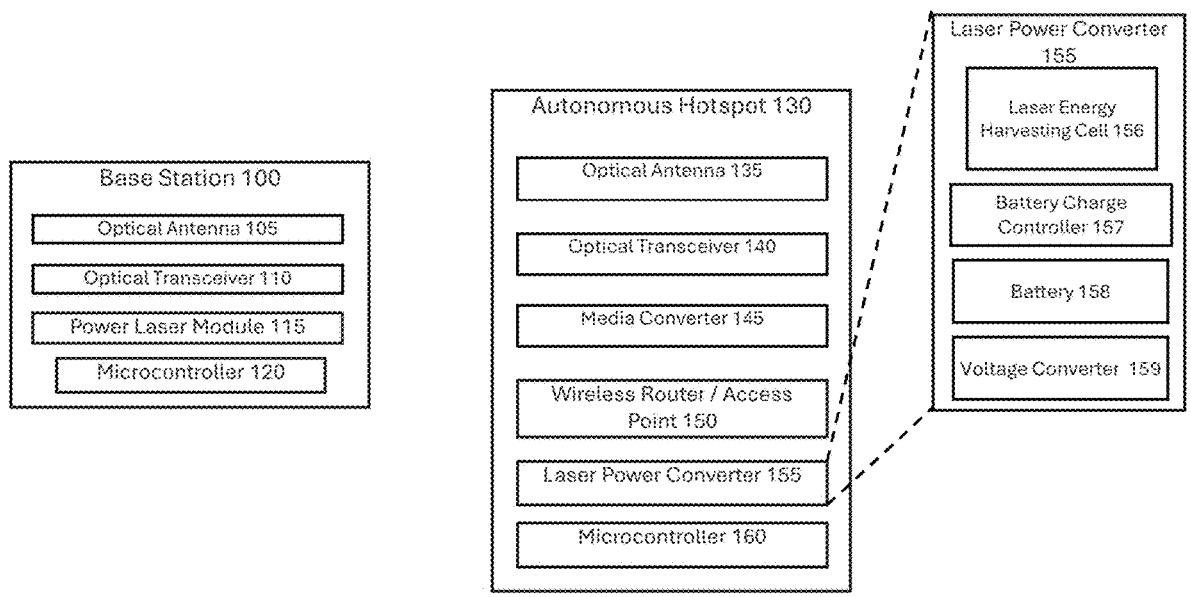
FIG. 1 is a block diagram that illustrates an optical wireless communication system including an optical base station and/or an autonomous wireless hotspot in accordance with exemplary embodiments of the disclosure.

FIG. 1 is a block diagram that illustrates an optical wireless communication system for communicating data and power including an optical base station and/or an autonomous wireless hotspot in accordance with exemplary embodiments of the disclosure. In exemplary embodiments, the optical wireless communication for communicating power and data may include one or more base stations 100 and/or one or more autonomous wireless hotspots or hotspot devices 130. Although only one base station 100 and one autonomous wireless hotspot device 130 is shown in FIG. 1, the optical wireless communication system described herein may include multiple base stations and corresponding hotspot devices or alternatively tens, hundreds and/or thousands of base stations and associated hotspot devices as described in detail below. Hotspot and hotspot devices may be used interchangeably within the specification.

In exemplary embodiments, the one or more optical base stations 100 may be communicatively coupled to the one or more autonomous wireless hotspots 130. In some embodiments, the communicative coupling may be optical coupling. In exemplary embodiments, the one or more optical base stations 100 may include an optical antenna 105, one or more optical transceivers 110, one or power laser modules 115 and/or one or more microcontrollers 120. In exemplary embodiments, the one or more optical base stations 100 may also include one or more memory devices (not shown) and/or computer-readable instructions (not shown). In some implementations, the computer-readable instructions may be stored in the one or more memory devices and may be executable by the one or more microcontrollers 120 to operate and/or control operations of the one or more base stations 100. In exemplary embodiments, the power laser module 115 may be optically coupled and/or electrically coupled or connected to the optical antenna 105. In exemplary embodiments, the power laser module 115 may generate and communicate a plurality of power laser light beams to the optical antenna 105 and the optical antenna 105 may direct the communicated plurality of power laser light beams to the autonomous wireless hotspot 130. In exemplary embodiments, the one or more optical transceivers 110 may receive data communication signals from a wireless router (of other data transmission device) and may convert the electrical data communication signals into optical data signals. In exemplary embodiments, the one or more optical transceivers 110 may communicate the plurality of optical data signals (or data laser light beams) to the autonomous wireless hotspot 130. In some implementations, the power laser light beams may be aligned with the optical data signals. In some implementations, the power laser light beams may be combined with the optical data signals (or data laser light beams) in order to reduce complexity.

In exemplary embodiments, the autonomous wireless hotspot 130 may include an optical antenna 135, one or more optical transceivers 140, one or more media converters 145, one or more wireless routers or access points 150, one or more laser power converters 155 and/or one or more microcontrollers 160. One important significant aspect of the claimed subject matter is that the autonomous wireless hotspot 130 does not include a power interface or a power cable interface and generates all power internally. In other words, the autonomous wireless hotspot 130 is self-powering (e.g., the laser power converter 155 provides power to the autonomous wireless hotspot 130). In some embodiments, there may be one or more autonomous wireless hotspots 130. This is significant because it allows for autonomous wireless hotspots to be placed or positioned in locations where no power outlet or interface is required. For example, the autonomous wireless hotspots 130 may be placed on walls or on ceilings in office environments, manufacturing facility environments, outdoor structures, and/or sporting event venues, along with other similar venues.

In exemplary embodiments, the autonomous wireless hotspot 130 may include one or more optical antennas 135. In some embodiments, there may be at least two optical antennas 135. In these embodiments, one of the optical antennas 135 in the autonomous wireless hotspot 130 may be used for receiving data laser light beams and another one of the optical antennas 135 may be used for receiving power laser light beams. In exemplary embodiments, one optical antenna 135 may be utilized to receive combined data laser light beams and power laser light beams. In other embodiments, the one or more optical transceivers 140 in the autonomous hotspot device 130 may be communicatively coupled to the one or more optical transceivers 110 in the base station 100 (where no optical antenna is necessary).

With respect to the data transmission, in exemplary embodiments, an optical antenna 135 may receive the combined power and data laser light beams from an optical antenna 105 in the base station 100, and the autonomous wireless hotspot 130 may separate out the data laser light beams and may communicate or transfer the data laser light beams to the one or more optical transceivers 140 in the autonomous wireless hotspot 130. In other embodiments, the optical antenna for the data transmission may receive the data laser light beams and the autonomous wireless hotspot 130 may transfer or communicate the data laser beams to the one or more optical transceivers 140. In exemplary embodiments, one or more optical transceivers 140 may be communicatively coupled to the one or more media converters 145. In exemplary embodiments, the one or more media converters 145 may receive the data laser light beams from the one or more optical transceivers 140 and may convert the data laser light beams into electrical data signals. In exemplary embodiments, the one or more media converters 145 may be communicatively coupled to the wireless router or access point 150. In exemplary embodiments, the one or more media converters 145 may communicate the electrical data signals to the one or more wireless routers or access points 150. In exemplary embodiments, the wireless router or access point 150 may receive the electrical data signals and may generate wireless data signals based at least in part on the electrical data signals. In exemplary embodiments, the one or more wireless routers or access points 150 may transmit the wireless data signals to an environment around the wireless router or access point 150. This may be an indoor environment, such as a room or a manufacturing facility or industrial facility. In other embodiments, the environment may be an outdoor environment where there is line-of-sight between the one or more optical base stations 100 and/or the one or more autonomous wireless hotspots 130.

With respect to power transmission, an optical antenna 135 in the autonomous hotspot 130 may receive the power laser light beams. In exemplary embodiments, the other optical antenna 135 may be communicatively coupled to one or more laser power converters 155. In exemplary embodiments, the other optical antenna 135 may direct and/or transmit the received power laser light beams to the one or more laser power converters 155. In embodiments where there is a separate power optical antenna, the power optical antenna may receive the separate power laser light beams and direct the received power laser light beams to the one or more laser power converters. In exemplary embodiments, the one or more laser power converters 155 may receive the power laser light beams and convert the power laser light beams into electrical power. In some embodiments, the one or more laser power converters 155 may include one or more resonant cavity photovoltaic devices. In exemplary embodiments, the generated electrical power may be utilized to power the autonomous hotspot 130. In some implementations, the generated electrical power from the laser power converter 155 may power all of the components of the autonomous hotspot 130. This is imperative and novel because this means the autonomous wireless hotspot 130 does not need to receive any power from a power cable or an external source power. This allows portability and use in indoor spaces and other embodiments without being tethered to an external power source. In exemplary embodiments, the autonomous hotspot 130 may also include one or more microcontrollers 160, one or more memory devices and/or computer-readable instructions. In exemplary embodiments, the computer-readable instructions may be accessed from the one or more memory devices and may be executable by the one or more processors in order to control operations of the autonomous hotspot 130. In exemplary embodiments, the electrical power generated by the laser power converter 155 may provide power to the one or more microcontrollers 160 and/or the one or more memory devices.

In exemplary embodiments, the one or more laser power converters 155 may include one or more laser energy harvesting cells 156, one or more battery charge controllers 157, one or more batteries 158 and/or one or more voltage converters 159. In exemplary embodiments, the one or more laser energy cells 156 may be optically coupled to the optical antenna 135 in the autonomous wireless hotspot 130. In exemplary embodiments, the optical antenna 135 may transmit or direct the power laser light beams to the one or more laser energy harvesting cells 156. In some implementations, the one or more laser energy harvesting cells or devices 156 may be a resonant cavity photovoltaic device or cell. In exemplary embodiments, the one or more laser energy harvesting cells or devices 156 may be coupled and/or connected to one or more battery charge controllers 157. In exemplary embodiments, the one or more laser energy harvesting cells 156 may convert the received power laser light beams into electrical power and may transmit the electrical power to the battery charge controller 157. In exemplary embodiments, the one or more battery charge controllers 157 may be coupled and/or connected to the one or more batteries 158 and/or the one or more voltage converters 159. In exemplary embodiments, the battery charge controller 157 may utilize the generated electrical power to charge the one or more batteries 158. In exemplary embodiments, the one or more battery charge controller 157 or the one or more batteries 158 may provide power to the one or more voltage converters 159. In some implementations, the one or more voltage converters 159 may receive the electrical power and may generate different direct current (DC) voltages, which may be utilized by different components in the autonomous hotspot 130. Thus the autonomous wireless hotspot device may be self-powered.

In exemplary embodiments, the power laser beams and the data laser beams may be combined into combined data and power laser light beams. This specific embodiment will be discussed in more detail below with respect to FIGS. 4 and 5. In these embodiments, a combiner device (not shown) may combine the power laser light beams (from the power laser module 115) and the data laser light beams (from the optical transceiver 110) to create combined power and data laser lights beams. In exemplary embodiments, the base station optical antenna 105 may receive the combined power and data laser light beams and transmit the combined power and data laser beams to the autonomous wireless hotspot 130 through for example free space optical communication links. In exemplary embodiments, the optical antenna 135 in the autonomous wireless hotspot device 130 may receive the combined power and data laser light beams and may transmit, distribute or direct the combined power and data laser light beams to an optical splitter device (not shown) to separate or divide out the power laser light beams from the data laser light beams. In exemplary embodiments, the separated data laser light beams may be transmitted to the one or more optical data transceivers 140, which may in turn transmit or communicate the separated data laser light beams to one or more media converters 145. In exemplary embodiments, the one or more media converters 145 may receive the data laser light beams and convert the data laser light beams into electrical data signals. In exemplary embodiments, the one or more media converters 145 may transmit or communicate the electrical data signals to the wireless router or access point 150. In exemplary embodiments, the wireless router or access point 150 may receive the electrical data signals, convert the electrical data signals into wireless (or radiofrequency) data signals and transmit the wireless data signals to an area around the autonomous hotspot. In exemplary embodiments, the separated out power laser light beams may be transmitted to one or more laser power converters 155. In exemplary embodiments, the one or more laser power converters 155 may receive the power laser beams and may convert the power laser light beams into electrical power or electrical energy. In exemplary embodiments, the electrical power or electrical energy may power all components of the autonomous hotspot so that the autonomous hotspot does not need any power from a cable or similar power source.

FIG. 2A illustrates a high-level data flow diagram of a wireless optical power and data system according to exemplary embodiments. In FIG. 2A, in exemplary embodiments, one or more base stations 205 (e.g., optical base stations) may communicate optical power laser light beams 207 to an autonomous hotpot 210, which has wireless communication capabilities such as being able to transmit wireless communication signals. In exemplary embodiments, the autonomous wireless hotspot may convert the optical power laser light beams 207 into electrical power or electrical energy. In these embodiments, the autonomous hotspot 210 may provide electrical power to all of the components in the autonomous wireless hotspot 210.

In exemplary embodiments, the one or more base stations 205 may be located within 30 meters to 5 kilometers from the autonomous wireless hotspot device. This allows efficient operation of a free space optical path for communication between the two devices. In other embodiments, the one or more base stations 205 may be located within 50 kilometers from the autonomous wireless hotspot device and in other embodiments, the one or more base stations may be located within thousands of kilometers from the autonomous wireless hotspot device.

In exemplary embodiments, the one or more base stations 205 (e.g., optical base stations) may communicate optical data laser light beams to the autonomous wireless hotspot 210. The autonomous wireless hotspot device may also transmit optical data laser light beams to the one or more base stations 205. In exemplary embodiments, the autonomous hotspot device 210 may convert the optical data laser light beams into electrical data signals and then into wireless data signals. In exemplary embodiments, the autonomous hotspot 210 may transmit or communicate the wireless data signals to a wireless coverage area 220. In some implementation, the wireless coverage area 220 may have a plurality of computing devices, mobile computing devices, and/or sensors located therein. As illustrated in FIG. 2A, in exemplary embodiments, the wireless coverage area 220 may communicate wireless data signals to a plurality of devices, including but not limited to a mobile computing device 214, a laptop computing device 213 and/or a sensor 211 in order for these devices to communicate to external devices utilizing an intranet and/or an internet. There may be multiple mobile computing or communication devices, laptop computing devices and/or sensors in the wireless coverage area.

Figure 2B:
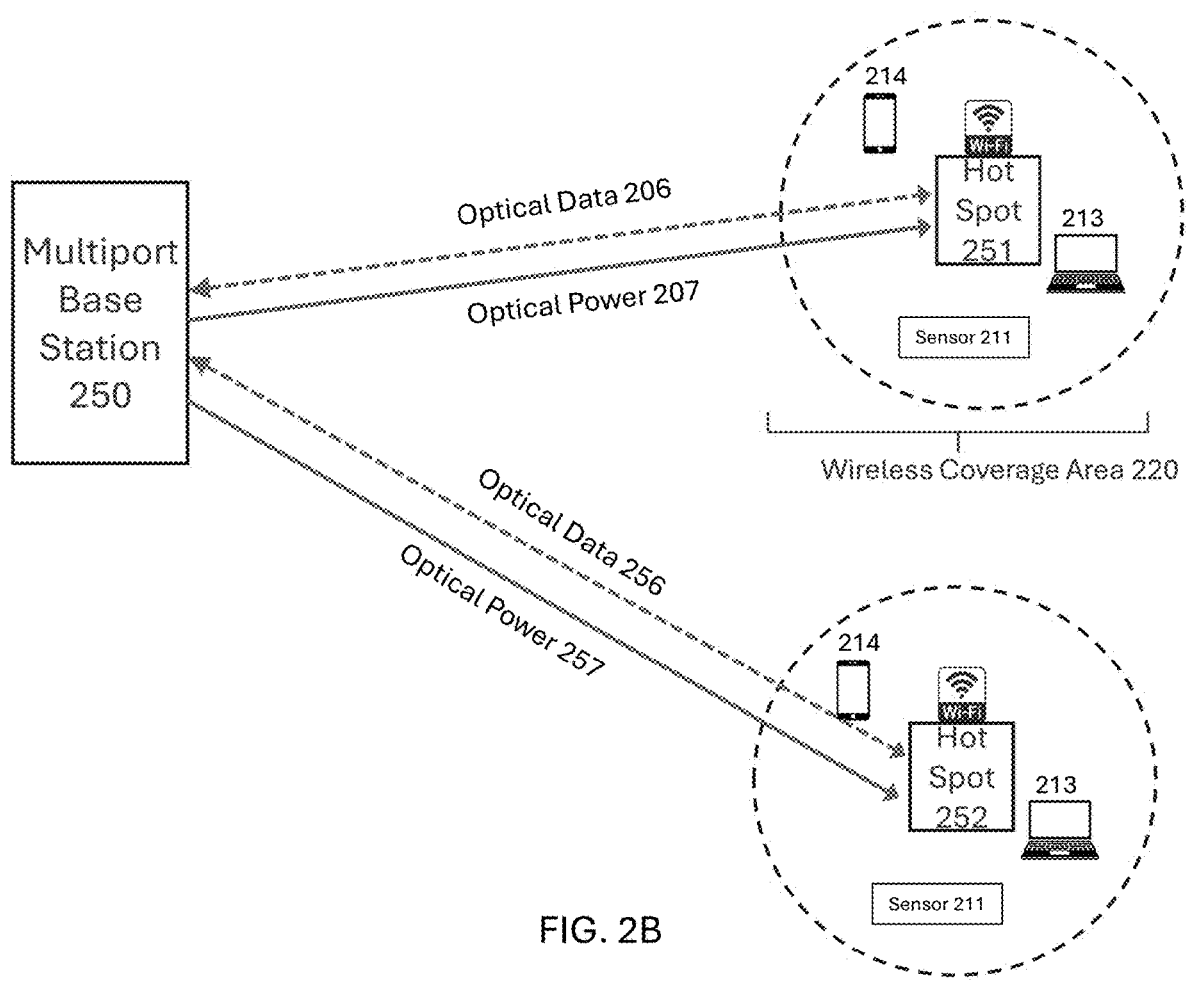
FIG. 2B illustrates a high level data flow diagram of a wireless optical power and data system including a multiport base station supporting multiple autonomous wireless hotspots according to exemplary embodiments.

FIG. 2B illustrates a high-level data flow diagram of a wireless optical power and data system including a multiport base station supporting multiple autonomous wireless hotspots according to exemplary embodiments. In FIG. 2B, in exemplary embodiments, a multiport base station 250 may communicate or transmit optical power laser light beams 207 and optical data laser light beams 206 to a first autonomous wireless hotspot 251 and also may communicate optical data laser light beams 256 and optical power laser light beams 257 to a second autonomous wireless hotspot 252. In other words, the multiport base station 250 may support communication with a plurality of autonomous wireless hotspots (two 251 and 252 are shown in FIG. 2B). In other embodiments, more than two autonomous wireless hotspots may be supported by the multiport base station 250 and FIG. 2B should not be seen as limiting in any aspect. In FIG. 2B, the multiport base station 250 may utilize two optical antennas in order to support the two autonomous wireless hotspots. In exemplary embodiments, the optical data laser light beams may be combined with optical power laser light beams as is discussed above and below and only one optical antenna may be utilized by the multiport base station. In exemplary embodiments, the optical data laser light beams 206 and 256 may be bidirectional and the optical power laser light beams 207 and 257 may be transmitted or communicated from the multiport base station 250 to the autonomous wireless hotspots 251 and 252. In exemplary embodiments, there may be multiple multiport base stations 250 and/or there may be a plurality of autonomous wireless hotspots 251 and 252 for each of the multiple multiport base stations 250.

The benefits of the subject matter described with respect to FIGS. 1, 2A and 2B include that the autonomous hotspot may be set up or installed quickly and/or cheaply without the need to run power cables or data cables and also without consuming too much radiofrequency bandwidth. In exemplary embodiments, in order to cover a larger geographical area or more space, the autonomous hotspots 210 may be replicated or duplicated so that there is only a low radiofrequency power footprint for each hotspot (and corresponding physical area). The subject matter described herein provides increased privacy (and makes it harder for hackers to eavesdrop) because of the reduced transmission radiofrequency power and/or also coverage area. In addition, the subject matter described herein improves network security and/or also provides a reduced exposure to radiofrequency radiation. Further, the subject matter described herein utilizes free space optical data delivery to deliver data to the autonomous wireless hotspot device, which is more efficient than RF data delivery due to a much lower beams divergence at optical wavelengths.

Figure 3:
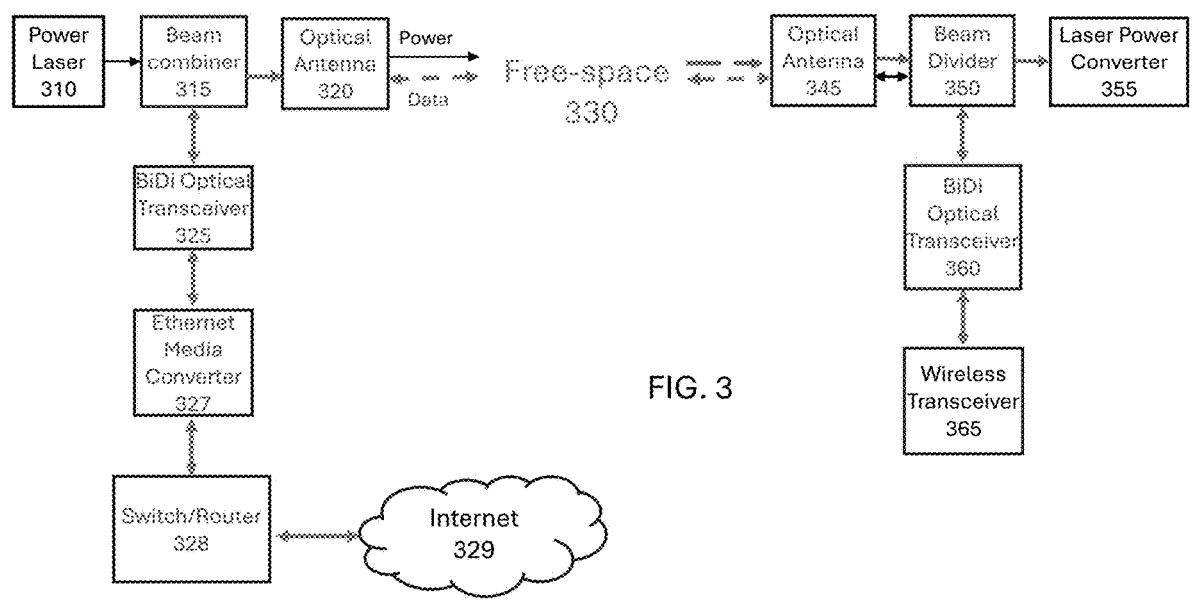
FIG. 3 illustrates a block diagram of a high level wireless optical power and data system according to exemplary embodiments.

FIG. 3 illustrates a high-level block diagram and data flow diagram of a wireless optical power and data system according to exemplary embodiments. In FIG. 3, in exemplary embodiments, the wireless optical power and data system 300 may include one or more base stations 305 and one or more autonomous wireless hotspots 340. In exemplary embodiments, the one or more base stations 305 may include one or more power laser devices 310, a laser beam combiner 315 (or multiple combiners), one or more bidirectional optical transceiver devices 325, one or more optical antennas 320, one or more Ethernet media converters 327, one or more switches or routers 328, and/or a global communication network (e.g., the Internet) 329. In exemplary embodiments, one or more autonomous wireless hotspots 340 may include one or more optical antennas 345, a laser beam divider or splitter 350 (or multiple dividers or splitters), one or more laser power converters 355, one or more bidirectional optical data transceivers 360 and/or one or more wireless communication transceivers 365. In FIG. 3, there is only one optical antenna device 320 and the power and laser light beams are combined before being input or transmitted through the optical antenna 320 in the base station 305. In other embodiments, the base station 305 may be a multiport base station and may include one or more optical antennas and each of the optical antenna devices may combine power laser light beams and data laser light beams. In exemplary embodiments, the power laser device 310 may transmit or communicate power laser light beams to the beam combiner device 315. In exemplary embodiments, a global communications network 329 may communicate analog or digital data signals to one or more switches or routers 328. In embodiments, the one or more switches or routers 328 may communicate the received data signals to one or more Ethernet media converters 327. In exemplary embodiments, the one or more Ethernet converters 327 may convert the received analog or digital data signals into optical data laser light beams. In exemplary embodiments, the bidirectional optical transceiver 325 may transmit or communicate the received optical data laser light beams to the beam combiner device 315. In exemplary embodiments, the beam combiner device 315 may combine the optical power laser light beams with the optical data laser light beams to create combined optical power and data laser light beams and to communicate, transfer or transmit the combined power and data laser light beams to the optical antenna 320. In exemplary embodiments, the optical antenna 320 may transmit or direct the combined power and data laser light beams through free space optical communication links 330 or free space channels to the autonomous wireless hotspot device 340. In exemplary embodiments, the autonomous hotspot's optical antenna 345 may receive the combined power and data laser light beams and direct the received combined power and data laser light beams to a beam divider 350 (or splitter) in the autonomous wireless hotspot device 340. In exemplary embodiments, the beam divider 350 (or splitter) may separate the received combined power and data laser light beams into received data laser light beams and received power laser light beams. In exemplary embodiments, the beam divider 350 may direct or transmit the received power laser light beams to the laser power converter 355 in order for the laser power converter 355 to convert the power laser light beams into electrical power or electrical energy (which powers the components of the autonomous hotspot 340 without use of a cable or a wire or an external power source). In exemplary embodiments, the beam combiner or divider 350 may direct or transmit the received data laser light beams to an optical data transceiver 360. In exemplary embodiments, the optical data transceiver 360 may be a bidirectional optical data transceiver 360. In exemplary embodiments, the bidirectional optical data transceiver 360 may communicate the received data laser light beams to one or more media converters (not shown) to cover the received data laser light beams to electrical data signals. In these implementations, the one or more media converters may transmit the electrical data signals to one or more wireless communication transceivers 365, which may convert the electrical data signals to wireless data signals. In some implementations, the wireless data signals may be received by one or more computing devices, IoT devices and/or sensor devices (as is discussed above with respect to FIGS. 2A and 2B). In exemplary embodiments, the one or more computing devices, IoT devices and/or sensor devices may wish to communicate wireless data signals back to the computing devices, IoT devices and/or sensor devices that originated the original data transmission or to other computing devices (such as server computing devices). In these embodiments, the one or more computing devices, IoT devices and/or sensor devices may communicate wireless data signals to the one or more wireless communication transceivers 365, which may convert the wireless data signals to return electrical data signals. In these embodiments, the return electrical data signals may be transmitted to the one or more media converter devices. In these embodiments, the one or more media converter devices may convert the return electrical data signals into return optical data signals and communicate or transmit the return optical data signals (or received optical data laser light beams) to the one or more bidirectional optical transceiver devices 360. In exemplary embodiments, the one or more bidirectional optical transceiver devices 360 may communicate the received return optical data laser light beams to either the beam combiner device 350 and/or the optical antenna 345. In exemplary embodiments, the optical antenna 345 may communicate the return optical data laser light beams through free-space optical communication links 330 to the base station's optical antenna 320. In exemplary embodiments, the optical antenna 345 may comminate the return optical data laser light beams to the beam combiner or divider 315 and/or the base station's bidirectional optical transceiver 325 in order for the return optical data laser beams to be converted into received return data electrical signals (utilizing the one or more ethernet media converters 327, the switches or routers 328 and/or global communication network 329 for use by the originating computing device (or other computing device).

Figure 4:
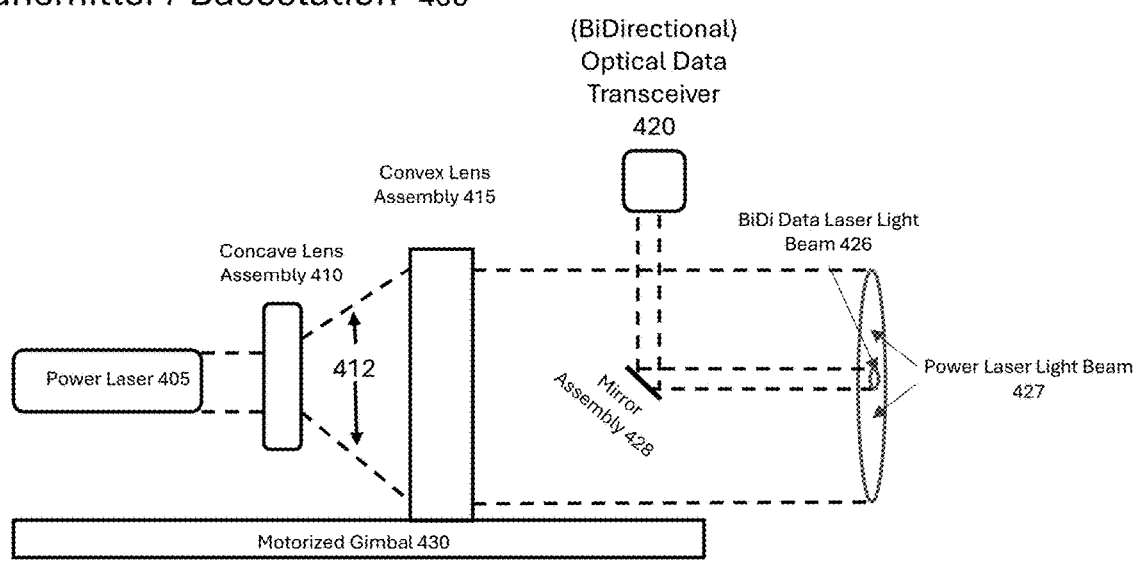
FIG. 4 illustrates a block diagram of a combined optical data and power transmitting device in a base station according to exemplary embodiments.

FIG. 4 illustrates a block diagram of a combined optical data and power transmitting device in an optical base station according to exemplary embodiments. In exemplary embodiments, the combined optical power and data transmitting device 400 includes one or more power laser devices 405, one or more concave lens assemblies 410, one or more convex lens assemblies 415, one or more optical data transceivers 420 and/or one or more mirror assemblies 428. In exemplary embodiments, the combined optical data and power transmitting device may further include one or more motorized gimbals 430 to move the one or more concave lens assemblies 410 and on or more convex lens assemblies 415 (and/or the one or more mirror assemblies 428). In exemplary embodiments, the one or more motorized gimbals 430 may include a mounting/alignment assembly, one or more motor assemblies, one or more processors or controllers, and/or one or more alignment sensors.

In exemplary embodiments, the one or more power laser devices 405 may be optically coupled to the one or more concave lens assemblies 410. In these embodiments, the one or more power laser devices 405 may communicate power laser light beams to the one or more concave lens assemblies 410 which may cause the power laser beams to diverge and form a wider light path (as shown by the dotted lines 412). In some implementations, the one or more lens assemblies 410 may be one or more concave lens assemblies. In exemplary embodiments, the one or more convex lens assemblies 415 may be optically coupled to the one or more concave lens assemblies 410. In exemplary embodiments, the divergent power laser light beams may then pass through the one or more convex lens assembles 415, which may collimate the power laser light beams. The combination of the one or more concave lens assemblies 410 and the one or more convex lens assemblies 415 may form a Galilean beam expander in order to produce collimated laser light beams. The Galilean beam expander may expand the beam due to a sequence of the one or more concave lens assemblies 410 and the one or more convex lens assemblies 415 and an expansion ratio may depend on the lenses and the distances between them. In exemplary embodiments, the power laser light beams 427 may form a conical shape. In exemplary embodiments, a media converter device may communicate the data laser light beams to one or more optical data transceivers 420, which may be optically coupled to one or more mirror assemblies 428. In exemplary embodiments, the one or more optical data transceivers 420 may generate data laser light beams which may be transmitted to the one or more mirror assemblies 428. In some embodiments, the one or more data laser light beams do not pass through the lens assemblies 410 or 415. In exemplary embodiments, the generated data laser light beams may reflect off the one or more mirror assemblies 428 and the reflected data laser light beams may be within the light path or envelope of the power laser light beams 427. In exemplary embodiments, the one or more mirror assemblies 428 may reflect the data laser light beams 426 into a center of the power laser light beams 427. This is due to the positioning of the one or more mirror assemblies with respect to the optical lens assemblies (e.g., the one or more concave lens assemblies 410 and/or the one or more convex lens assemblies 415). In these embodiments, this allows the data laser light beams 426 to be centered and/or aligned with the power laser light beams 427. This may be beneficial later when measuring if travelling through free space optics (or free space optical communication links) has distorted the power laser light beams and/or the data laser light beams. In addition, in exemplary embodiments, the one or more mirror assemblies 428 may also block the power laser light beams in an area where the data laser light beams may be located so that there is no interference between the data laser light beams and the power laser light beams.

In exemplary embodiments, the combined optical power and data laser transmitting device (or base station) 400 may be able to be aligned based on feedback from a receiving device or receiving node (which may be an autonomous wireless hotspot device). In exemplary embodiments, the receiving node may transmit an alignment signal (either optically or wirelessly via WiFi transceivers, local area network transceivers or personal area network transceivers). In exemplary embodiments, the receiving node may be an autonomous wireless hotspot. In exemplary embodiments, the motorized gimbal or gimbal assembly 430 may include one or more alignment sensors, one or more processors or controllers, one or more motor assemblies, and one or more motor alignment assemblies. In exemplary embodiments, one or more alignment sensors on the laser transmitting device 400 may receive the alignment signal from the receiving node and transmit an alignment measurement to one or more processors or controllers. In exemplary embodiments, the one or more processors or controllers may analyze the alignment measurement and determine if the combined optical power and data laser transmitting device (or base station) needs to be mechanically adjusted or aligned. In exemplary embodiments, if the transmitting device is determined to need adjustment or alignment, the one or more processors or controllers may communicate a motor alignment signal to the one or more motor assemblies. In exemplary embodiments, the one or more motor assemblies may be coupled and/or connected to a mounting alignment assembly. In exemplary embodiments, the one or more motor assemblies may change an orientation and/or alignment of the motorized gimbal assembly 430 (and thus the lens assemblies 410 and 415 and the transmitting device 400) by communicating alignment instructions or commands. In the implementations, the resulting combined power and data laser light beams may be positionally adjusted to form a better alignment with the optical antennas of one or more receiving nodes (or one or more autonomous wireless communication devices).

Figure 5:
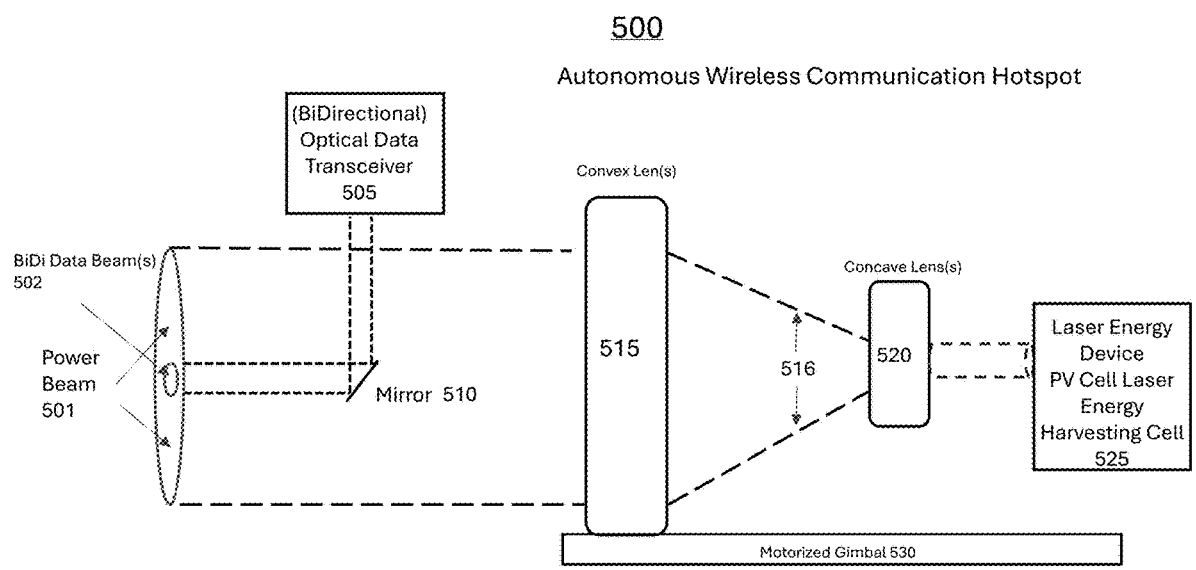
FIG. 5 illustrates a block diagram of a combined optical data and power receiving device according to exemplary embodiments.

FIG. 5 illustrates a block diagram of a combined optical data and power receiving device according to exemplary embodiments. In exemplary embodiments, the combined optical data and power receiving device 500 may include one or more optical data transceivers 505, one or more convex lens assemblies 515, one or more mirror assemblies 510, one or more concave lens assemblies 520, one or more motorized gimbals or gimbal assemblies 530 or and/or one or more laser power converters 525 (including one or more laser energy PV devices or cells). In exemplary embodiments, the combined power and data laser light beams are received by the receiver 500 and may pass through the one or more optical antennas (345 in FIG. 3). In exemplary embodiments, the data laser light beams 502 may be reflected by the one or more mirror assemblies 510 to one or more optical data transceivers 505 (which may be one or more bidirectional optical data transceivers 505). In exemplary embodiments, the data laser light beams are processed as discussed above with respect to FIGS. 1, 2A, 2B and 3 and will not be repeated here. In exemplary embodiments, the power laser light beams 501 may pass through one or more convex lens assemblies 515 which may narrow a width of the power laser light beams or may converge the power laser light beams (as shown by reference number 516). In exemplary embodiments, the converged power laser light beams may be directed or transmitted through one or more convex lens assemblies 520 to align and/or collimate the power laser light beams so that the power laser light beams are transmitted, transferred or communicate to the laser energy device 525 and specifically the photovoltaic laser energy device (or cells) in the laser power converter or laser energy device 525. The combination of the one or more concave lens assemblies 410 and the one or more convex lens assemblies 415 may form a Galilean beam expander in order to produce collimated laser light beams. The Galilean beam expander may reduce (or expand) the beam due to a sequence of the one or more convex lens assemblies 515 and the one or more concave lens assemblies 520 and a reduction ratio (or expansion ratio) may depend on the lenses and the distances between them. In exemplary embodiments, the power laser light beams 427 may form a conical shape. The operation of the laser power converter is described in FIGS. 1, 2A, 2B and 3 and will not be repeated here. In exemplary embodiments, when the bidirectional optical data transceiver 505 in the receiving device 500 wants to transmit data back to the originating transmitting device (or another device), the bidirectional optical data transceiver 505 may communicate the data laser beams to the one or more mirror assemblies 510 which will reflect or transmit the data laser beams through the optical antenna to free space optical channels or free space optical communication links (as is described in detail in FIG. 3) and back to the original transmitting device (which may be an optical base station as describe in FIGS. 1 to 3) The one or more convex lens assemblies 515 and the one or more concave lens assemblies 520 may form a Galilean beam reducer and produce collimate power laser light beams that are passed, transmitted or transferred to the laser energy device 525.

In exemplary embodiments, the combined optical power and data laser transmitting device may be able to be aligned with the combined optical power and data laser receiving device based on feedback from the transmitting device (which may be the base station). In exemplary embodiments, the transmitting node may transmit an alignment signal (either optically or wirelessly via WiFi, local area network communications or personal area network communication). In exemplary embodiments, an autonomous hotspot motorized gimbal or gimbal assembly 530 may include one or more alignment sensors, one or more processors or controllers, one or more motor assemblies, and one or more motor alignment assemblies. In exemplary embodiments, one or more alignment sensors on the motorized gimbal assembly 530 may receive an alignment signal (from the transmitting node) and may transmit an alignment measurement to one or more processors or controllers in the motorized gimbal 530 or the autonomous hotspot 500. In exemplary embodiments, the one or more processors or controllers may analyze the alignment measurement and determine if any components in the autonomous wireless hotspot device 500 may need to be mechanically adjusted or aligned to obtain a better and/or higher quality signal from the transmitting device or base station. In exemplary embodiments, if the receiving node (or autonomous wireless hotspot) is determined to need adjustment or alignment, the one or more processors or controllers may communicate a motor alignment signal to the one or more motor assemblies. In exemplary embodiments, the one or more motor assemblies may be coupled and/or connected to the motorized gimbal assembly 530. In exemplary embodiments, the one or more motor assemblies may change an orientation and/or alignment of the motorized gimbal assembly by communicating alignment instructions or commands. In the implementations, the resulting combined power and data laser light beams may be adjusted to form a better alignment with the one or more transmitting nodes (or one or more base stations).

Figure 6:
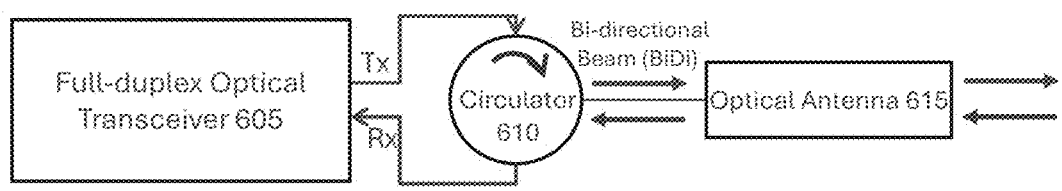
FIG. 6 illustrates a bidirectional data transceiver according to exemplary embodiments.

In exemplary embodiments, the bidirectional optical data transceivers may utilize an optical circulator in order to only the data and laser light beams via one physical free space optical channel or free space optical communication link (which may save bandwidth and minimize alignment issues between the transmitting and receiving devices). FIG. 6 illustrates a block diagram of interaction of a bidirectional optical transceiver, an optical circulator and/or an optical antenna. In exemplary embodiments, the one or more full-duplex bidirectional optical data transceivers 610 be communicatively coupled to the one or more optical circulators 615. In exemplary embodiments, the one or more bidirectional optical data transceivers 610 may include two separate transmit (Tx) and receive (Rx) ports and thus provides two physical optical channels (transmit channel Tx 611 and receive channel 612). It is very difficult to align two separate physical optical beams because it is very challenging to control roll in addition to pitch and yaw for both optical beams. In contrast, a single bidirectional physical laser light beam can be aligned without the necessity of controlling the yaw axis due to the circular symmetry of a single laser light beam. In exemplary embodiments, the one or more optical circulators 615 may be used to separate optical signals that travel in opposite directions through the free-space optical channel, for example to achieve bi-directional transmission over a single free-space optical channel. In other words, the data laser light beams may flow in both directions between the optical antenna 620 and the one or more directional optical transceivers due to the use of the optical circulator 615. In other words, a bidirectional link consisting of two fibre strands (one for each direction) may be multiplexed onto a single strand of optical fibre using the optical circulator 615.

In other embodiments, millimeter wave transceivers may also be utilized to enhance operations of the optical base station (or transmitting device) and the autonomous wireless hotspot (or receiving device). In exemplary embodiments, millimeter waves may have wavelengths of 1 millimeter or range from 1 to 10 millimeters, although other wavelengths may be utilized. Millimeter wave beams may have a frequency band ranging from 30 to 300 Gigahertz. In exemplary embodiments, the millimeter wave band may be designated as an extremely high frequency band. In addition, in some cases, the term millimeter wave may also be shortened for ease of readability to mm-Wave.

Figure 7:
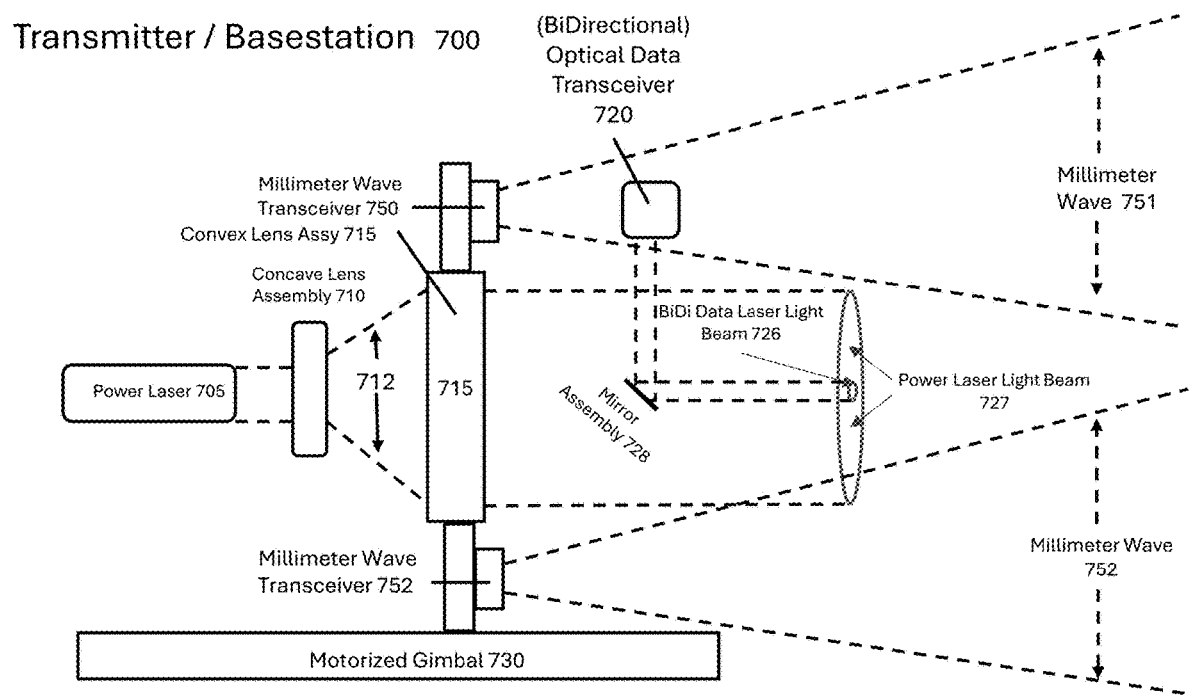
FIG. 7 illustrates a block diagram of a transmitting device transmitting a composite optical power, optical data and millimeter wave beam according to exemplary embodiments.
Figure 8:
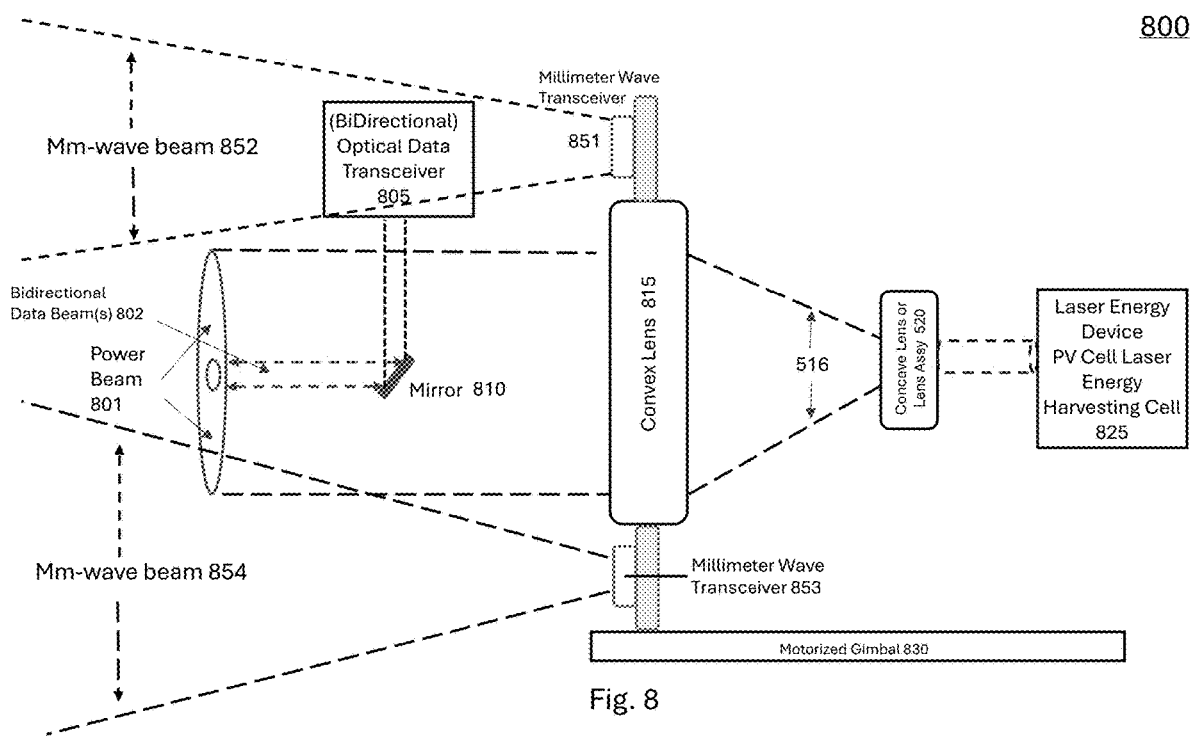
FIG. 8 illustrates a block diagram of a receiving device receiving a composite optical power, optical data and millimeter wave beam according to exemplary embodiments.

In exemplary embodiments, the optical base station may also include two or more millimeter wave transceivers and the autonomous wireless hotspots may also include two millimeter wave transceivers. In some embodiments, the two or more millimeter wave transceivers may not use the optical antennas in the optical base station and/or autonomous wireless hotspots. In other embodiments, the two or more millimeter wave transceivers may utilize the antennas (e.g., optical antennas) in the optical base stations and autonomous wireless hotspot devices. In exemplary embodiments, the millimeter wave transceivers may generate mm-wave beams (that are self-aligned with the combined power and data laser light beams already being transmitted by the optical base station) by placing or positioning the two or more, mm-wave transceivers on a structure, housing, plate or mechanical assembly that including one or both of the lens assemblies and/or the mirror assemblies of the optical base stations and/or the autonomous wireless hotspot devices. In exemplary embodiments, the mm-wave transceivers (and thus the mm-wave beams) may be utilized to communicate or transmit backup or redundant data signals, which may act as a redundancy when an optical path is blocked for the data laser light beams, when the optical data transceiver (or data laser beam) fails or when the optical data transceiver is inoperable. In exemplary embodiments, the mm-wave transceivers on the optical base station and/or the autonomous wireless hotspot may communicate with each other in order to perform a coarse alignment process. In these embodiments, the mm-wave transceivers in the optical base station or the autonomous wireless hotspot device may receive the mm-wave beams and the mm-wave transceivers or other components of the optical base station or autonomous wireless hotspot device may analyze a signal strength of the received mm-wave beams. If the mm-wave beam strength does not meet a threshold, the receiving device may communicate with the transmitting device to better align the transmitting device to generate, produce and/or communicate a stronger strength mm-wave beam. In exemplary embodiments, the mm-wave transceivers may be utilized as a side channel for network management (e.g., the management of multiple systems including multiple base stations and the autonomous wireless hotspot devices). As mentioned above, the mm-wave wave beam may be self-aligned with the combined power and data laser light beams. In exemplary embodiments, having an optical base station with mm-wave transceivers (and a power laser and an optical data transceiver) and an autonomous wireless hotspot with mm-wave transceivers may be ideal for a satellite to ground communication line because when clouds block laser light paths, the communication link between the optical base station and the autonomous wireless hotspot devices may continue to operate via the mm-wave beams generated by the mm-wave transceivers. FIG. 7 illustrates a transmitting device (optical base station) including mm-wave transceivers in accordance with embodiments. FIG. 8 illustrates a receiving device (e.g., an autonomous wireless hotspot) including mm-wave transceivers in accordance with embodiments.

Figure 9:
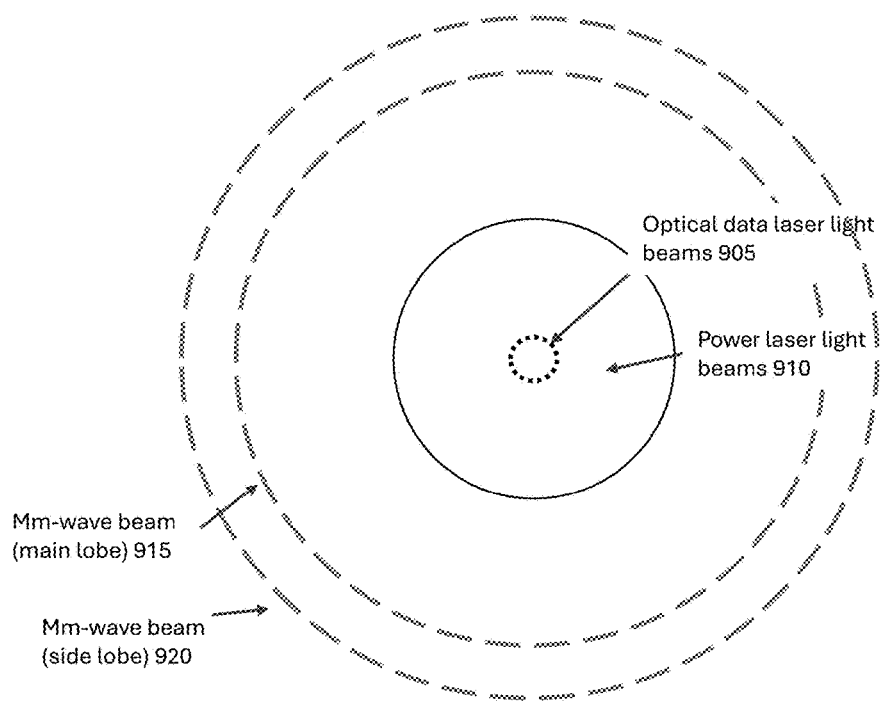
FIG. 9 illustrates a cross-section of a hybrid optical data, optical power and millimeter wave beam according to exemplary embodiments. As implied by the name, millimeter waves are electromagnetic waves with a wavelength ($\lambda$) that is approximately

FIG. 7 illustrates a transmitting device (or optical base station) in accordance with embodiments. FIG. 7 does not illustrate the one or more optical antennas that are utilized to transmit the composite beams (e.g., the composite power laser light beams, the data laser light beams, and/or the mm-wave beams) that are part of the base station 700. The transmitting device (or optical base station) 700 of FIG. 7 includes many of the components and/or the features of the transmitting device (or optical base station) 400 of FIG. 4 with the addition of two or more mm-wave transceivers 750 and/or 752. In exemplary embodiments, the transmitting device or base station 700 may include two or more millimeter wave (mm-wave) transceivers 750 and 752, one or more power laser devices 705, one or more concave lens assemblies 710, one or more convex lens assemblies 715, one or more optical data transceivers 720, one or more mirror assemblies 728, and/or one or more motorized gimbals or gimbal assemblies 730. In exemplary embodiments, the similar components in FIG. 7 operate in similar fashion as the components in the optical base station of FIG. 4. The combination of the one or more concave lens assemblies 710 and the one or more convex lens assemblies 715 may form a Galilean beam expander in order to produce collimated laser light beams. The Galilean beam expander may expand the beam due to a sequence of the one or more concave lens assemblies 710 and the one or more convex lens assemblies 715 and an expansion ratio may depend on the lenses and the distances between them. The combined power and data laser light beams includes the power laser light beam 727 and the data laser light beams 726. In exemplary embodiments, the two or more millimeter wave transceivers are positioned on top of (mm-wave transceiver 750) and below the (mm-wave transceiver 752) the convex lens assembly 715 on an assembly or surface that may be coupled and/or connected to the motorized gimbal assembly 730. In exemplary embodiments, this assembly, mount or surface may also be coupled and/or connected to the one or more concave lens assemblies 710 and/or the one or more mirror assemblies 728. This configuration and/or positioning may provide more coverage area for the generated mm-wave beams. FIG. 9 illustrates a cross-section of the power laser light beams, the data laser light beams and/or the millimeter wave beams in accordance with embodiments. In FIG. 9, the three beams may be a single hybrid beam having three constituent components. In exemplary embodiments, as discussed above, the data laser light beams 905 may be a smaller diameter wave positioned in a center location of the power laser light beams 910. In exemplary embodiments, the data laser light beams and the power laser light beams 910 may be aligned due to positioning of the one or more mirror assemblies 728 and the one or more lens assemblies 710 and 715 in the optical base station. In exemplary embodiments, the millimeter wave beam main lobe 915 may be a larger beam and may encompass the power laser light beams 910 and the data laser light beam 905. Although the positioning is shown in FIG. 9 as the data laser light beams 905 and the power laser light beams 910 being in a center of the millimeter wave beams main lobe 915. However, in other embodiments, a relative position of the data laser light beams 905 and the power laser light beams 910 with respect to the millimeter wave beams may vary however, the positioning of the millimeter wave beams are fixed and/or aligned with the data laser light beams and/or the power laser light beams may be fixed due to positioning and/or locations in the optical base station and/or the wireless autonomous hotspot. In exemplary embodiments, the millimeter wave beams may include a side lobe 920. In exemplary embodiments, the millimeter wave side lobe 920 may have a larger diameter and may be positioned outside of the millimeter wave main lobe beams 915, as illustrated in FIG. 9.

Returning to FIG. 7, in exemplary embodiments, one millimeter wave transceiver 750 of the two or more millimeter wave transceivers may transmit millimeter waves 751 to one or more wireless autonomous hotspots. FIG. 7 does not illustrate the one or more optical antennas that are utilized to receive the composite beams (e.g., the composite power laser light beams, the data laser light beams, and/or the mm-wave beams) that is part of the optical base station 700. In exemplary embodiments, another millimeter wave transceiver 752 of the two or more millimeter wave transceivers may also transmit millimeter wave beams 753 to the one or more wireless autonomous hotspots. By having two or more millimeter wave transceivers, a coverage area for the millimeter wave transceivers 750 and 752 of the optical base station 700 is larger area in order to include the wireless autonomous hotspots. In exemplary embodiments, one or more data transceivers (e.g., wired or wireless data transceivers) in the optical base station 700 may be coupled to the two or more millimeter wave transceivers 750 and 752 and may provide backup analog or digital data for the optical base station 700. In other words, in this specific circumstance, the two or more millimeter wave transceivers 750 and 752 may be transmitting backup data (which is the same or similar to the data signals that are being transmitted by the one or more optical data transceivers 720) in case the one or more optical data transceivers fail, have line of sight with respect to the autonomous wireless hotspot devices compromised, or may have clouds between the optical base station 700 and the autonomous wireless hotspots. In addition to or alternatively to the transmission of data (or backup data), the two or more millimeter wave transceivers 750 and 752 may transmit alignment signals or alignment signal parameters to the autonomous wireless hotspot to provide a coarse alignment between the optical base station 700 and the one or more autonomous wireless hotspots. Coarse alignment of the optical base station 700 and the one or more autonomous wireless hotspots may operate as follows. The two or more millimeter wave transceivers 750 and 752 may transmit a plurality of millimeter wave beams to one or more of the two or more millimeter wave transceivers 851 and 853 on the autonomous wireless hotspot devices 800. In exemplary embodiments, the millimeter wave transceivers 851 and/or 853 receive the plurality of the millimeter wave beams. In exemplary embodiments, the autonomous wireless hotspot 800 may receive the plurality of the millimeter wave beams and may analyze a signal strength of the received plurality of millimeter wave beams. In exemplary embodiments, if the signal strength of the received plurality of millimeter wave beams is less than a threshold signal strength, this means that there may be an issue with the alignment of the base station and the autonomous wireless hotspot devices and/or the millimeter wave transceivers on the base station and/or autonomous wireless hotspot device. In these exemplary embodiments, the autonomous wireless hotspot device may transmit an alignment signal or control signal through the millimeter wave transceivers 851 or 853 or other wireless communication transceivers to the optical base station. In these exemplary embodiments, the optical base station 700 may receive the alignment signal or control signal and send the alignment or control signal to the one or more gimbal assemblies 730 in the base station to align positioning of the optical base station, the lens assemblies 710 715, and/or the mirror assemblies 728. This may operate in reverse in that the two or more millimeter wave transceivers 851 and 853 of the autonomous wireless hotspots may transmit millimeter wave beams to the optical base station 700 and its two or more millimeter wave transceivers 750 and 752 (which may analyze the strength of the received millimeter wave beams and generate control or alignment signals if the signal strength is too low or below a threshold).

In exemplary embodiments, in addition to or alternatively to the transmission of backup data and/or alignment data, the two or more millimeter wave transceivers 750 and 752 may transmit network management signals and/or parameters. In other words, a network of optical base stations and/or autonomous wireless hotspots may be managed by local network computing devices and/or cloud computing devices and the two or more millimeter wave transceivers 750 752 may communicate various operating parameters and/or status parameters to the local network computing devices and/or cloud computing devices directly or through the one or more autonomous wireless hotspots 800. This listed functionality may allow the optical base station 700 to operate in a more efficient fashion and provide many additional capabilities.

FIG. 8 illustrates a block diagram of a receiving device or wireless autonomous hotspot according to exemplary embodiments. FIG. 8 does not illustrate the one or more optical antennas that are utilized to receive the composite beams (e.g., the composite power laser light beams, the data laser light beams, and/or the millimeter wave beams (mm-wave beams) that is part of the autonomous wireless hotspot 800. In exemplary embodiments, the wireless autonomous hotspot described herein with respect to FIG. 8 operates in a similar fashion to the receiving device or wireless autonomous hotspot described in FIG. 5. In exemplary embodiments, similar components in the FIG. 8 wireless autonomous hotspot 800 (e.g., the lens assemblies 815 and 820, the mirror assemblies 810, the optical data transceivers 805, the motorized gimbal 830 and/or the laser energy device, PV cell or device laser energy harvesting cell 825) may operate in a similar fashion as described with the similar or same components in FIG. 5. In addition, the autonomous wireless hotspot device 800 may receive the combined power and data laser light beams which includes the power laser light beams 801 and the data laser light beams 802. In FIG. 8, although one wireless autonomous hotspot may be shown, this block diagram may apply to more than one wireless autonomous hotspots. In FIG. 8, the autonomous wireless hotspot 800 may include one or more mirror assemblies 810 to reflect the received data laser light beams 802 in the combined power and data laser light beams transmitted by the optical base station (and to reflect response optical data laser light beams to the optical base station), one or more lens assemblies (e.g., convex lens assemblies 815 and/or concave lens assemblies 820 may receive and pass through the power laser lights beams 801 received from the optical base station to the laser energy device 825 (which may convert the power laser light beams into electrical power) and provide electrical power for the components of the laser energy device 825. As mentioned above, in exemplary embodiments, the convex lens assemblies 815 and the concave lens assemblies 820 may form a Galilean beam reducer (or expander) that provides collimated laser light beams to the laser energy device 825 for conversion into electrical energy. In exemplary embodiments, one millimeter wave transceiver 851 may receive mm-wave beams from the optical base station (not shown) and may transmit mm-wave beams 852 to the optical base station (or other computing devices in an area around the autonomous wireless hotspot). In exemplary embodiments, another millimeter wave transceiver 853 may receive mm-waves generated by millimeter wave transceivers 750 and 752 in the optical base station. In exemplary embodiments, another millimeter wave transceiver 853 may transmit or communicate multimedia wave beams 854 to the optical base station or other computing devices in the area of the autonomous wireless hotspot 800.

In embodiments or situations where the millimeter wave transceivers 851 and 853 may be utilized to receive backup digital or analog data transmitted from the base station, the millimeter wave transceivers 851 and 853 may receive the millimeter wave backup data beams and transfer the alignment signals to other components in the autonomous wireless hotspot in order to extract backup data or parameters. As an illustrative example, these additional components may be amplifiers, mixers, filters, analog to digital converters and digital signal processors to convert the mm-wave backup data signals into backup data (e.g., digital backup data). In exemplary embodiments, one or more processors or controllers in the autonomous wireless hotspot 800 may execute computer-readable instructions to process the backup data and may communicate or transfer the processed back data to one or more data transceivers located in the autonomous wireless hotspot 800. In exemplary embodiments, the process may also operate in reverse (where the millimeter wave transceivers 851 and 853 of the autonomous wireless hotspot devices 800 transmit backup data to the optical base station 800).

In embodiments or situations where the millimeter wave transceivers 851 and 853 may be utilized to perform coarse alignment between the autonomous wireless hotspot 800 and base station 700, the two or more millimeter wave transceivers 851 and 853 may receive the alignment signals or parameters and transfer the alignment signals to other components in the autonomous wireless hotspot in order to extract alignment data or parameters. As an illustrative example, these additional components may be amplifiers, mixers, filters, analog to digital converters and digital signal processors to convert the mm-wave alignment signals into alignment data or parameters. In exemplary embodiments, one or more processors or controllers in the autonomous wireless hotspot 800 may execute computer-readable instructions to process the alignment data or parameters and may generate hotspot alignment signals to the motorized gimbal 830 in order to better align or position the autonomous wireless hotspot 800 to the base station 700.

The systems and devices described herein may be utilized in indoor environments, hybrid environments and/or outdoor environments. In exemplary embodiments, the one or more optical base stations and the one or more autonomous wireless hotspot devices may be installed in indoor environments such as offices, manufacturing environments, retail stores, convention centers, banquet or conference facilities. In these embodiments, it is preferable that the one or more optical base stations and the one or more autonomous wireless hotspot devices have line of sight with each other in order for the combined power and data laser light beams to be transmitted between the one or more optical base stations and the one or more autonomous wireless hotspot devices. In these embodiments, the one or more optical base stations and/or the one or more autonomous wireless hotspot devices may be installed or attached to the ceiling or on walls or vertical surfaces so as to have good visibility with the opposite receiving device. In addition, by having the one or more optical base stations and the one or more autonomous wireless hotspot devices located or positioned high on vertical surfaces or on ceilings, safety may be increased because there is little chance that the combined power and laser light beams will be near occupants' eyes. In outdoor environments, it is preferable to install, locate or position the one or more optical base stations and the autonomous wireless hotspot devices so that there is good visibility and no objects between the groups of devices. This will improve the performance of the one or more optical base stations and the autonomous wireless hotspot devices and minimize interference with the combined power and laser light beams that are being transmitted between the one or more optical base stations and the autonomous wireless hotspot devices. Further, the one or more autonomous wireless hotspot devices do not have to be near power outlets because the autonomous wireless hotspot devices are self-power and thus self-sufficient.

In embodiments or situations where the millimeter wave transceivers or transmissions may be utilized to receive and/or transmit network management data or parameters, the two or more millimeter wave transceivers 851 and 853 may receive the network management millimeter wave beams and/or transfer the received millimeter wave beams to other components in the autonomous wireless hotspot 800 in order to process and/or extract the network management data, requests and/or parameters. These may be processed as discussed above with respect the other embodiments or situations. In exemplary embodiments, one or more processors or controllers in the autonomous wireless hotspot 800 may communicate the received network management data and/or parameters to computing devices such as local network or cloud-computing devices which are monitoring network operations (e.g., a network of a plurality of base stations and/or autonomous wireless hotspots). In addition, the one or more processors or controllers of the autonomous wireless hotspot may also communicate or transfer status parameters and operating parameters of the autonomous wireless hotspot (and components therein) to the two or more millimeter wave transceivers 851 and 853 in embodiments where the autonomous wireless hotspots is feeding back status parameters and operating parameters to the base station 700 or to other local area computing devices and/or cloud computing devices.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. An optical wireless power and data delivery system, comprising:
   an optical base station, the optical base station including:
      one or more data switches or routers configured to receive analog or digital data signals from a communications network;
      a first media converter device configured to convert the received analog or digital data signals into a plurality of data laser light beams;
      a first optical data transceiver configured to transmit the plurality of data laser light beams received from the first media converter device;
      one or more power laser devices configured to transmit a plurality of power laser light beams,
      a beam combining device configured to receive the plurality of power laser beams and the data laser light beams and generate combined power and data laser light beams; and
      a first optical antenna configured to receive the combined power and data laser light beams; and to transmit or pass through the combined power and data laser light beams through one or more free space optical channels or communication links; and
   an autonomous wireless hotspot device, the autonomous wireless hotspot device including:
      a second optical antenna configured to receive the combined data and power laser light beams from the optical beam base station via the one or more free space optical channels or communication links;
      an optical dividing device configured to separate out hotspot data laser light beams and hotspot power laser light beams from the combined power and data laser light beams;
      a second optical data transceiver configured to receive the hotspot data laser light beams from the optical dividing device and to transmit the hotspot data laser light beams;
      a second media converter device configured to convert the hotspot data laser light beams into analog or digital data signals;
      one or more wireless transceivers configured to receive the converted analog or digital data signals and to convert the converted analog or digital data signals to wireless data signals and to transmit the wireless data signals to an area around the autonomous wireless hotspot device; and
      one or more laser power converters configured to receive the hotspot power laser light beams and to convert the hotspot power laser light beams into electrical energy, wherein the electrical energy provides power to components of the autonomous wireless hotspot device without any cable provided electrical power.

2. The optical wireless power and data delivery system of claim 1, wherein the first optical data transceiver and the second optical data transceiver are bidirectional optical transceivers.

3. The optical wireless power and data delivery system of claim 1, wherein the first media converter device and the second media converter device are Ethernet media converter devices.

4. The optical wireless power and data delivery system of claim 1, the beam combining device of the optical base station including one or more concave lens assemblies, one or more convex lens assemblies, and one or more mirror assemblies,
   the one or more concave lens assemblies configured to receive the plurality of power laser light beams and cause divergence of the plurality of power laser light beams;
   the one or more convex lens assemblies to receive the diverged plurality of power laser light beams from the one or more concave lens assemblies and to generate a plurality of power laser light beams to be directed to the first optical antenna.

5. The optical wireless power and data delivery system of claim 4,
the one or more mirror assemblies configured to reflect the plurality of data laser light beams and direct the reflected plurality of data laser light beams to the first optical antenna, wherein the first optical antenna receives the reflected plurality of data laser light beams and received plurality of power laser light beams to create the combined power and data laser light beams.

6. The optical wireless power and data delivery system of claim 5, wherein the one or more mirror assemblies are positioned in a center of an optical path of the plurality of power laser light beams and are aligned with the plurality of power laser light beams.

7. The optical power and data delivery system of claim 6, wherein the one or more mirror assemblies block a center area of the plurality of power laser light beams and the combined power and data laser light beams.

8. The optical power and data delivery system of claim 5, further including a motorized gimbal, the motorized gimbal coupled to the beam combining device or the first optical antenna to align the combined power and data laser light beams with the second optical antenna of the autonomous wireless hotspot device in response to a feedback or alignment signal generated by the autonomous wireless hotspot device.

9. The optical power and data delivery system of claim 1, where the optical dividing device includes one or more hotspot mirror assemblies, one or more hotspot convex lens assemblies and one or more hotspot concave lens assemblies, the one or more mirror assemblies configured to separate one or more hotspot data laser light beams from the combined power and data laser light beams and reflect the one or more hotspot data laser light beams to the second optical data transceiver.

10. The optical power and data delivery system of claim 9, the one or more hotspot convex lens assemblies to receive a plurality of hotspot power laser light beams of the combined power and laser light beams from the second optical antenna and to generate a plurality of converging power laser light beams; and
the one or more second concave lens assemblies to receive the plurality of converging power laser light beams to and to direct the plurality of received power laser light beams to the one or more laser energy devices, the one or more laser energy devices configured to generate electrical energy from the plurality of received power laser light beams.

11. The optical power and data delivery system of claim 10, further including a hotspot motorized gimbal assembly, the hotspot motorized gimbal assembly coupled to the one or more hotspot mirror assemblies, the one or more hotspot convex lens assemblies the one or more hotspot concave lens assemblies, or the second optical antenna, the hotspot motorized gimbal assembly to receive a control or alignment signal from the optical base station and to control positioning of the one or more hotspot mirror assemblies, the one or more hotspot convex lens assemblies, the one or more hotspot concave lens assemblies or the second optical antenna in response to the received control or alignment signal from the optical base station.

12. The optical power and data delivery system of claim 1, the optical base station further comprising two or more millimeter wave transceivers, the two or more millimeter wave transceivers configured to generate millimeter wave beams that are transmitted as part of the combined power and data laser light beams to the autonomous wireless hotspot device.

13. The optical power and data delivery system of claim 12, wherein the generated millimeter wave beams include data signals that are backup data signals to the plurality of data laser light beams in the combined power and data laser light beams.

14. The optical power and data delivery system of claim 12, the autonomous wireless hotspot device further comprising two or more hotspot millimeter wave transceivers, the two or more hotspot millimeter wave transceivers configured to receive the generated millimeter wave beams from the optical base station and to convert the generated hotspot millimeter wave beams into hotspot digital data signals.

15. The optical power and data delivery system of claim 14, wherein the transmitted generated millimeter wave beams, the power laser light beams and the data laser light beams form a single hybrid combined beams that are aligned.

16. A combining and alignment device for transmitting laser light beams, comprising:
one or more transmitter concave lens assemblies, the one or more transmitter concave lens assemblies configured to receive the plurality of divergent laser light beams and to transmit a plurality of divergent power laser light beams;
one or more transmitter convex lens assemblies, the one or more transmitter convex lens assemblies configured to receive the plurality of divergent power light beams and to transmit a plurality of power laser light beams to an optical antenna;
one or more transmitter mirror assemblies, the one or more transmitter mirror assemblies configured to receive and reflect a plurality of data laser light beams to the optical antenna which creates combined power and data laser light beams; and
one or more motorized gimbal assemblies, the one or more motorized gimbal assemblies configured to receive an alignment signal from a receiver or autonomous wireless hotspot device and to align the one or more transmitter convex lens assemblies, the one or more transmitter concave lens assemblies, the one or more transmitter mirror assemblies or the optical antenna with respect to the receiver or autonomous wireless hotspot device.

17. The combining and alignment device of claim 16, wherein the one or more transmitter mirror assemblies is positioned to create the plurality of data laser light beams in a center of the plurality of power laser light beams and in alignment with the plurality of power laser light beams.

18. The combining and alignment device of claim 16, wherein the one or more transmitting mirror assemblies blocks a center area of the plurality of power laser light beams.

19. A dividing and alignment device for receiving combined laser light beams in a receiving device, comprising:
one or more receiver mirror assemblies, the one or more receiver mirror assemblies configured to receive a combined plurality of power and data laser light beams from a transmitting device or optical base station and to reflect data laser light beams to one or more optical data transceivers;
one or more receiver convex lens assemblies, the one or more receiver convex lens assemblies to receive a plurality of power laser light beams without the plurality of data laser light beams and to generate a plurality of converging receiver power laser light beams;

one or more receiver concave lens assemblies, the one or more receiver concave lens assemblies to receive the plurality of converging power laser light beams and to transmit or generate the plurality of power light beams to one or more laser power converters in the receiving device; and one or more motorized gimbals, the one or more motorized gimbals configured to receive an alignment signal from a transmitting device or optical base station and to align the one or more receiver mirror assemblies, the one or more receiver convex lens assemblies, and/or the one or more receiver concave lens assemblies with respect to the transmitter device.

* * * * *